Feb. 24, 1925.
W. H. NOLAN
FRAME CONSTRUCTION FOR VEHICLES
Filed July 13, 1921
1,527,268
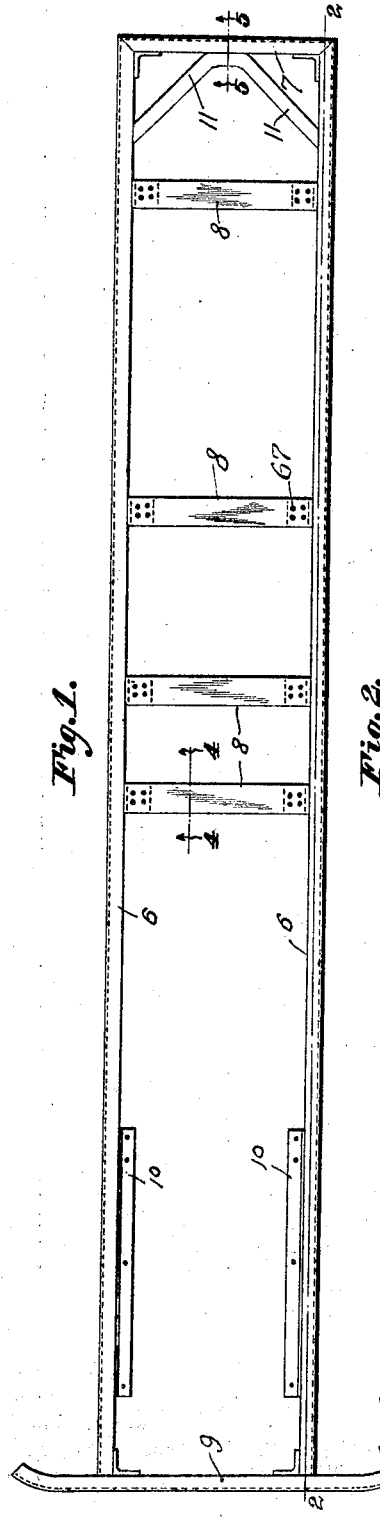
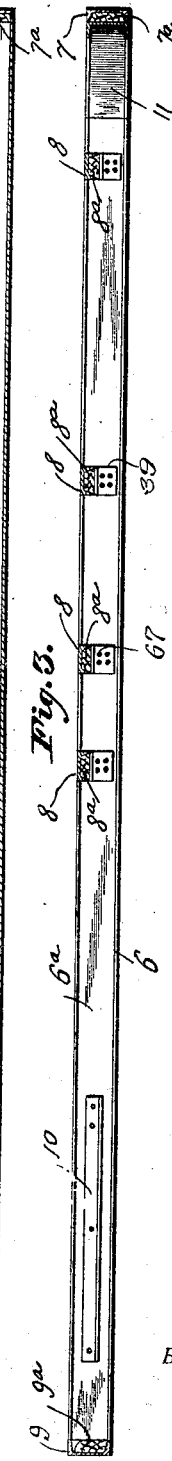
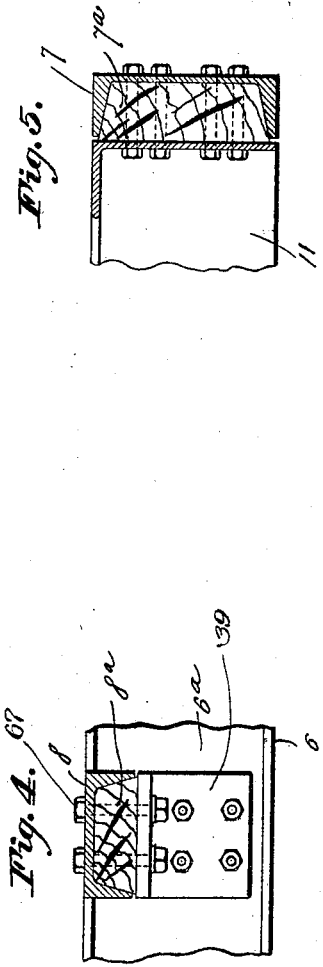
INVENTOR.
William H. Nolan
BY
ATTORNEY.

Patented Feb. 24, 1925.

1,527,268

UNITED STATES PATENT OFFICE.

WILLIAM H. NOLAN, OF CHICAGO, ILLINOIS.

FRAME CONSTRUCTION FOR VEHICLES.

Application filed July 13, 1921. Serial No. 484,465.

*To all whom it may concern:*

Be it known that I, WILLIAM H. NOLAN, a citizen of the United States, residing at Chicago, in the county of Cook and State of Illinois, have invented new and useful Improvements in Frame Construction for Vehicles, of which the following is a specification.

This invention relates to a frame construction for motor trucks and other heavy motor vehicles, and its object is to provide a frame assembly composed of channeled members provided with a filler to absorb vibrations and to deaden the sound.

In order that the invention may be better understood, reference is had to the accompanying drawing in which, Figure 1 is a plan view of the complete frame assembly;

Fig. 2 is a longitudinal section on the line 2—2 of Fig. 1;

Fig. 3 is a central longitudinal section of the frame and,

Figs. 4 and 5 are enlarged sectional views on the lines 4—4 and 5—5 of Fig. 1.

Referring specifically to the drawing, the frame assembly consists of channelled side pieces 6, a rear cross member 7, a number of intermediate cross members 8, and a front cross member 9, which latter is arranged to serve as a bumper. The side pieces 6 also carry supports 10 for the motor. These several elements are rigidly connected in any approved manner which is immaterial to the present invention. The various cross members are also channeled.

Each channeled member is provided with a shock-absorbing and sound-deadening filler consisting of a wooden beam which seats snugly in the channel and is secured therein in any suitable manner. The beam completely fills the channel and extends throughout the entire length thereof. The filler of one of the side pieces 6 is shown at 6ᵃ in Fig. 2, and the fillers of the cross members 7, 8 and 9 are shown at 7ᵃ, 8ᵃ and 9ᵃ in Fig. 2. One of the cross members 8 is also shown in Fig. 4, and the rear cross member is shown in Fig. 5. Diagonal braces 11 extend between the side members and the rear cross member.

The wooden fillers for the channeled frame members effectually serve as shock-absorbers and sound-deadeners and the construction is simple and inexpensive.

Referring to Figs. 4 and 5 it will be noted that the wooden fillers not only completely fill the channeled frame members but they also protrude sufficiently from the channels so that when the adjacent frame members are bolted on, they are in contact with the fillers and not with the frame members themselves. A metal-to-metal contact is therefore prevented resulting in a maximum absorption of vibration and deadening of sound.

Particular attention is directed to the fact that the L-shaped brackets 39 which support the cross members 8 are joined with the channeled sides 6 and the cross members 8 by means of bolts 67. The bolts 67 not only serve as a means for connecting the brackets 39 to the channeled side and cross members but also as a means for securing the wooden filler members in place.

I claim:

1. A motor vehicle frame comprising channeled end and side members, wooden filler members received in said channeled side members and projecting beyond the edges of said channeled members, cross members associated with said frame and formed with channels, a second set of wooden filler members received in said cross members and projecting beyond the edges of the same, and connecting means for joining said cross members to said frame and having attaching bolts extending entirely through said filler members and said first and second named channeled members whereby the attaching bolts for said connecting means are also employed to secure said filler members in position.

2. A motor vehicle frame comprising channeled side and cross members, wooden filler strips completely filling the channels in said members, brackets for joining said side and cross members and arranged flatly in contact with said filler strips, and fastening bolts extending through said brackets and said channeled members and also extending through said wooden filler strips whereby the bolts are employed to secure the wooden strips to the channeled side and cross members, said filler strips being extended beyond the side and cross members and spacing the same from the edges of said channeled members.

In testimony whereof I affix my signature.

WILLIAM H. NOLAN.